(12) United States Patent
Nisbet (10) Patent No.: US 11,496,167 B2
(45) Date of Patent: Nov. 8, 2022

(54) RF SIGNAL SWITCH

(71) Applicant: SKYWORKS SOLUTIONS, INC., Irvine, CA (US)

(72) Inventor: John Jackson Nisbet, Ottawa (CA)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 0 days.

(21) Appl. No.: 17/021,308

(22) Filed: Sep. 15, 2020

(65) Prior Publication Data

US 2021/0091808 A1 Mar. 25, 2021

Related U.S. Application Data

(60) Provisional application No. 62/904,761, filed on Sep. 24, 2019.

(51) Int. Cl.
*H04B 1/04* (2006.01)
*H04B 1/00* (2006.01)
*H04B 1/44* (2006.01)

(52) U.S. Cl.
CPC ........... *H04B 1/0483* (2013.01); *H04B 1/006* (2013.01); *H04B 1/44* (2013.01)

(58) Field of Classification Search
CPC .... H04B 1/006; H04B 1/0483; H04B 1/1615; H04B 1/44; H04B 7/0604; H04B 7/0693; H04B 7/0831; H04B 7/0871; H04B 7/0877; H03K 17/005; H03K 17/007; H03K 17/08122; H03K 17/08128; H03K 17/102; H03K 17/107; H03K 17/161; H03K 17/168; H03K 17/687; H03K 17/693
USPC ........ 375/260, 349, 351; 327/376, 377, 382, 327/389–391, 404; 370/217–220, 358, 370/359, 388; 455/63.3, 333, 335
See application file for complete search history.

(56) References Cited

U.S. PATENT DOCUMENTS

| | | | |
|---|---|---|---|
| 6,351,294 B1* | 2/2002 | Yamamoto | H04B 1/005 348/731 |
| 7,164,897 B2* | 1/2007 | Manku | H03D 7/1441 455/208 |
| 8,559,907 B2* | 10/2013 | Burgener | H04B 1/0475 455/333 |
| 2006/0194567 A1* | 8/2006 | Kelly | H03K 17/6871 455/408 |
| 2006/0281418 A1* | 12/2006 | Huang | H04B 1/48 455/78 |
| 2017/0047666 A1* | 2/2017 | Khlat | H03H 7/0115 |
| 2017/0141759 A1* | 5/2017 | Srirattana | H03H 11/04 |
| 2018/0131368 A1* | 5/2018 | Lu | H04B 1/44 |

* cited by examiner

*Primary Examiner* — Young T. Tse
(74) *Attorney, Agent, or Firm* — Lando & Anastasi, LLP (57) ABSTRACT

Systems and methods are provided herein that include an improved RF switch assembly. In at least one embodiment, the RF switch assembly may have an optimized topology including a common node shared by each signal path, reducing the size and cost of the RF switch assembly and providing improved performance.

20 Claims, 6 Drawing Sheets

RF SIGNAL SWITCH

CROSS-REFERENCE TO RELATED APPLICATIONS

This application claims priority under 35 U.S.C. § 119(e) to U.S. Provisional Patent Application Ser. No. 62/904,761, titled RF SIGNAL SWITCH, filed Sep. 24, 2019, the content of which is incorporated herein by reference for all purposes.

BACKGROUND

Wireless communication devices commonly use one or more instances of transmit and receive circuitry to generate and amplify transmit signals and to amplify and process receive signals, respectively. One or more antennas in such wireless communication devices are typically connected to transmit and receive circuitry through one or more radio-frequency (RF) switches, sometimes referred to as "transmit/receive switches" or "antenna switches." Such RF switches must be capable of meeting stringent performance requirements for switch parameters such as return loss, insertion loss, and isolation. Conventional approaches for providing desired switch performance often include switch layouts and additional components or circuitry that can significantly increase the footprints of both the switch and the wireless communication devices themselves.

SUMMARY OF THE INVENTION

According to an aspect of the present invention, a radio-frequency switch assembly is provided. The radio-frequency switch assembly comprises a plurality of inputs, each input of the plurality of inputs being configured to receive a radio-frequency signal of a plurality of radio-frequency signals, a plurality of outputs configured to provide the plurality of radio-frequency signals, a plurality of input switches, and a plurality of output switches. Each input switch of the plurality of input switches is coupled between a corresponding input of the plurality of inputs and a common node, and each output switch of the plurality of output switches is coupled between the common node and a corresponding output of the plurality of outputs.

In some embodiments, each input switch of the plurality of input switches is configured to be turned on to provide the radio-frequency signal received by the input corresponding to the input switch to the common node. In various embodiments, each output switch of the plurality of output switches is configured to be turned on to provide the radio-frequency signal from the common node to the output corresponding to the output switch.

In various embodiments, the radio-frequency switch assembly includes a shunt inductance coupled between the common node and a reference potential. In various embodiments, a first radio-frequency signal of the plurality of radio-frequency signals has a first signal frequency. In certain embodiments, a value of the shunt inductance is based at least in part on the first signal frequency. In some embodiments, the shunt inductance is configured to provide optimal compensation for a combined parasitic capacitance of the plurality of input switches and the plurality of output switches at the first signal frequency.

In certain embodiments, the radio-frequency switch assembly includes a shunt switch connected between the common node and a reference potential. In some embodiments, the shunt switch is turned on to couple the common node to the reference potential to improve isolation of the radio-frequency switch assembly. In various embodiments, the shunt switch is turned on to improve the isolation of the radio-frequency switch assembly when each of the plurality of input switches and each of the plurality of output switches are turned off.

According to another aspect of the invention, a radio-frequency switch assembly having at least two modes of operation is provided. The radio-frequency switch assembly comprises a plurality of inputs, each input of the plurality of inputs being configured to receive a radio-frequency signal of a plurality of radio-frequency signals, a plurality of outputs configured to provide the plurality of radio-frequency signals, a plurality of input switches, each input switch of the plurality of input switches being coupled between a corresponding input of the plurality of inputs and a common node, a switchable shunt capacitance switchably connected between the common node and a reference potential, and a plurality of output switches, each output switch of the plurality of output switches being coupled between the common node and a corresponding output of the plurality of outputs.

In some embodiments, each input switch of the plurality of input switches is configured to be turned on to provide the radio-frequency signal received by the input corresponding to the input switch to the common node. In various embodiments, each output switch of the plurality of output switches is configured to be turned on to provide the radio-frequency signal from the common node to the output corresponding to the output switch.

In various embodiments, the plurality of radio-frequency signals have a plurality of signal frequencies. In some embodiments, the radio-frequency switch assembly includes a shunt inductance coupled between the common node and the reference potential. In certain embodiments, a value of the shunt inductance is based at least in part on a first signal frequency of the plurality of signal frequencies.

In some embodiments, during a first mode of operation the switchable shunt capacitance is disconnected from the reference potential and the common node has a first common node capacitance corresponding to a parasitic capacitance of the plurality of input switches and a parasitic capacitance the plurality of output switches. In various embodiments, during the first mode of operation the shunt inductance provides optimal compensation for the first common node capacitance at the first signal frequency.

In some embodiments, during a second mode of operation the switchable shunt capacitance is connected to the reference potential and the common node has a second common node capacitance corresponding to the parasitic capacitance of the plurality of input switches, the parasitic capacitance of the plurality of output switches, and the switchable shunt capacitance. In various embodiments, a value of the switchable shunt capacitance is based at least in part on a second signal frequency of the plurality of signal frequencies. In some embodiments, during the second mode of operation the shunt inductance provides optimal compensation for the second common node capacitance at the second signal frequency. In certain embodiments, the switchable shunt capacitance includes a variable capacitor having a plurality of capacitance values. In various embodiments, the variable capacitor is adjusted to one of the plurality of capacitance values based at least in part on a selected signal frequency of the plurality of signal frequencies. In some embodiments, during the second mode of operation the shunt inductance provides optimal compensation for the second common node capacitance at the selected signal frequency.

In certain embodiments, the radio-frequency switch assembly includes a shunt switch connected between the common node and the reference potential. In some embodiments, the shunt switch is turned on to couple the common node to the reference potential to improve isolation of the radio-frequency switch assembly.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures may be represented by a like numeral. For purposes of clarity, not every component may be labeled in every figure. In the figures.

DETAILED DESCRIPTION

Aspects and examples are directed to RF switch assemblies and components thereof, and to devices, modules, and systems incorporating the same.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, end, side, vertical and horizontal, and the like, are intended for convenience of description, not to limit the present systems and methods or their components to any one positional or spatial orientation.

As discussed above, wireless communication devices often include one or more RF switches to couple transmit and receive circuitry to one or more antennas. For example, RF switches may be configured to provide transmit signals from transmit circuitry to an antenna and to provide signals received by an antenna to receive circuitry. In some examples, such RF switches may include multiple transistor-based switches and the transistor-based switches may be assembled or arranged to provide an RF switch having a desired number of inputs (e.g., poles) and outputs (e.g., throws).

Figure 1:
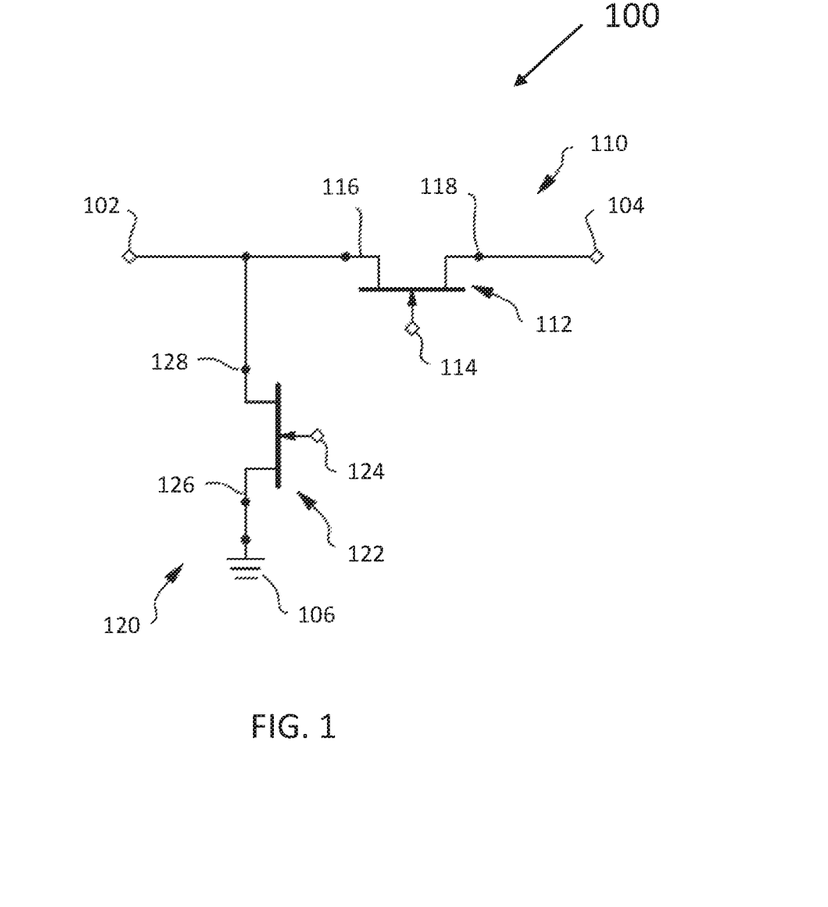
FIG. 1 is a schematic diagram of an example of a transistor-based switch.

FIG. 1 illustrates one example of a transistor-based signal switch 100 having a signal input 102 and a signal output 104. The switch 100 includes a series arm 110 between the signal input 102 and the signal output 104 and a shunt arm 120 between the signal input 102 and ground 106. In other examples, the shunt arm 120 may be included between the signal output 104 and ground 106. In various examples, the signal input 102 and the signal output 104 may be reversible without affecting the component, e.g., the switch 100. In certain applications, however, the designation of signal input and signal output may be of consequence.

The switch 100 includes field effect transistors (FETs) 112, 122 in the series arm 110 and the shunt arm 120, respectively. The transistors 112, 122 may each be one of many types of FETs in the art. For example, each may be a junction FET (JFET) or a metal oxide semiconductor FET (MOSFET), may be a silicon on insulator (SOI) MOSFET, and may be of N-channel or P-channel types, and enhancement or depletion mode types.

Each of the transistors 112, 122 has a gate 114, 124, a drain 116, 126, and a source 118, 128. A control voltage applied to, and received at, the gate 114, 124 of each transistor 112, 122 controls the conductivity of a channel between the drain 116, 126 and the source 118, 128. In certain examples, the transistors 112, 122 may be of different types and may be connected in a different way than shown. For example, the source and drain of each may be connected in a manner opposite that shown. Additionally, the series arm 110 and/or the shunt arm 120 may include additional transistors connected in series with the transistors 112, 122 shown. For example, the series arm 110 may include a series stack of transistors and the shunt arm 120 may include a shunt stack of transistors.

The switch 100 is controllable to be in an on state to conduct a signal received at the signal input 102 and provide the signal to the signal output 104 by controlling the series arm 110 to be closed (i.e., conducting) and controlling the shunt arm 120 to be open (i.e., non-conducting) by applying appropriate control voltages to each of the gates 114, 124. In some examples a control voltage may be applied to a gate through a resistor.

To operate in an off state, the transistor 112 of the series arm 110 is controlled to be open (i.e., non-conducting) and the transistor 122 of the shunt arm 120 is controlled to be closed (i.e., conducting). In such state, the switch 100 substantially blocks signals received at the signal input 102 and does not allow such signals to pass through to the signal output 104, at least in part due to the transistor 112 presenting a (capacitive) open circuit between the input 102 and the output 104, and the transistor 122 providing a conducting signal path to ground 106, substantially diverting the signal received at the signal input 102.

In some examples, the shunt arm 120 may be optional and the switch 100 may be operated in the on state by controlling the series arm 110 to be closed (i.e., conducting) and in the off state by controlling the series arm 110 to be open (i.e., non-conducting).

Figure 2A:
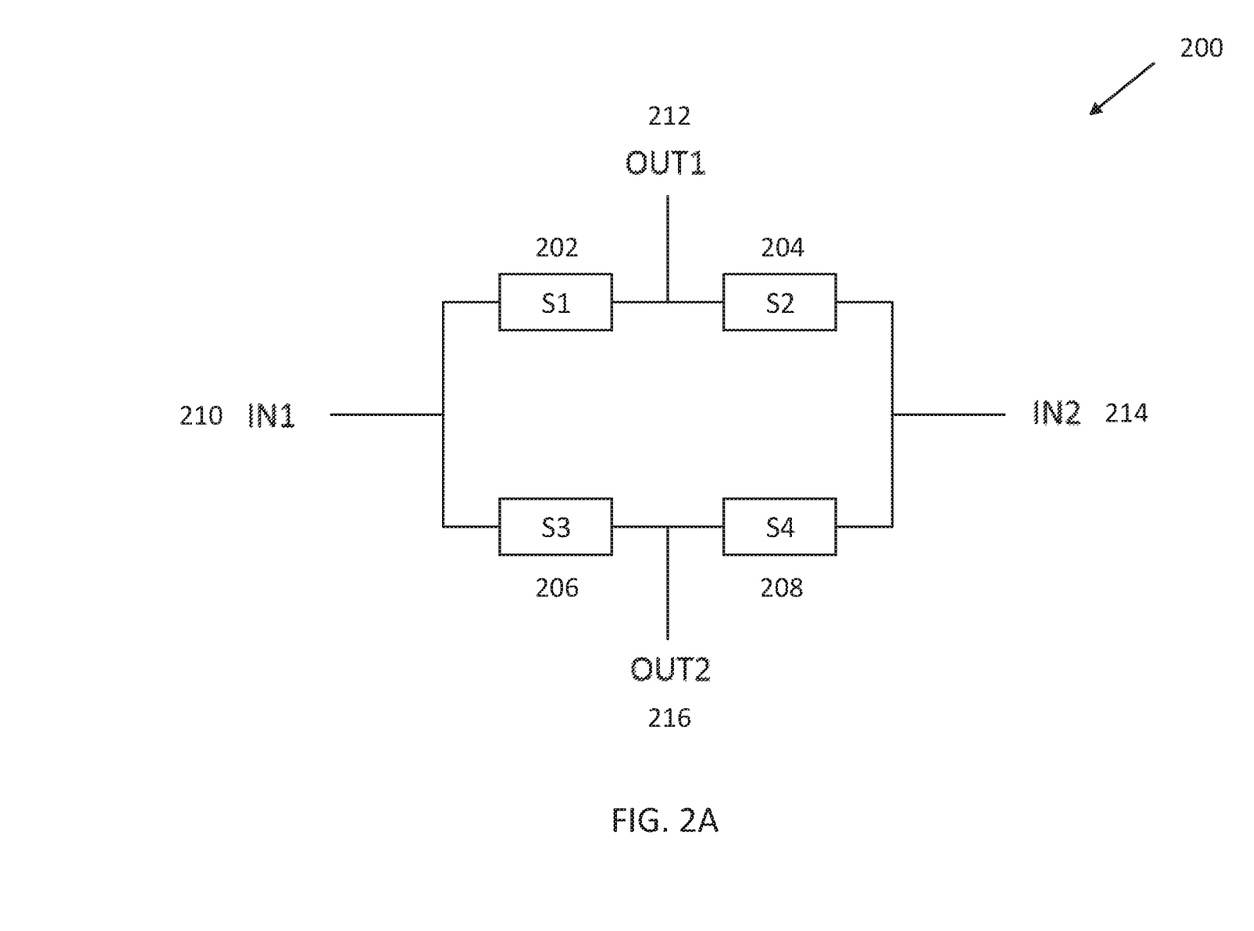
FIG. 2A is schematic diagram of an example of an RF switch assembly.

FIG. 2A is a schematic block diagram illustrating an example of a radio-frequency (RF) switch assembly 200. The example RF switch assembly 200 shown is a double-pole double-throw (DPDT) switch having a pair of signal inputs and a pair of signal outputs. The RF switch assembly 200 includes a first RF switch 202, a second RF switch 204, a third RF switch 206, and a fourth RF switch 208. In one example, the transistor-based signal switch 100 can be used for each of the RF switches 202-208 (with or without the shunt arm 120).

The first RF switch 202 is coupled between a first signal input 210 and a first signal output 212, and may be turned on to provide a signal from the first signal input 210 to the first signal output 212. The second RF switch 204 is coupled between a second signal input 214 and the first signal output 212, and may be turned on to provide a signal from the second signal input 214 to the first signal output 212. The third RF switch 206 is coupled between the first signal input 210 and a second signal output 216, and may be turned on to provide a signal from the first signal input 210 to the second signal output 216. The fourth RF switch 208 is coupled between the second signal input 214 and the second signal output 216, and may be turned on to provide a signal from the second signal input 214 to the second signal output 216.

Each of the RF switches 202-208 may be fabricated on a substrate, and the substrates may be arranged on a switch die. In some examples, the transistors (e.g., 112 and 122) of each RF switch 202-208 can develop a parasitic capacitance to ground. For example, a parasitic capacitance may develop across the substrate between the transistors 112 and/or 122 and ground. During operation, these developed parasitic capacitances can degrade the return loss and insertion loss of the RF switch assembly 200, especially in high-frequency applications.

Figure 2B:
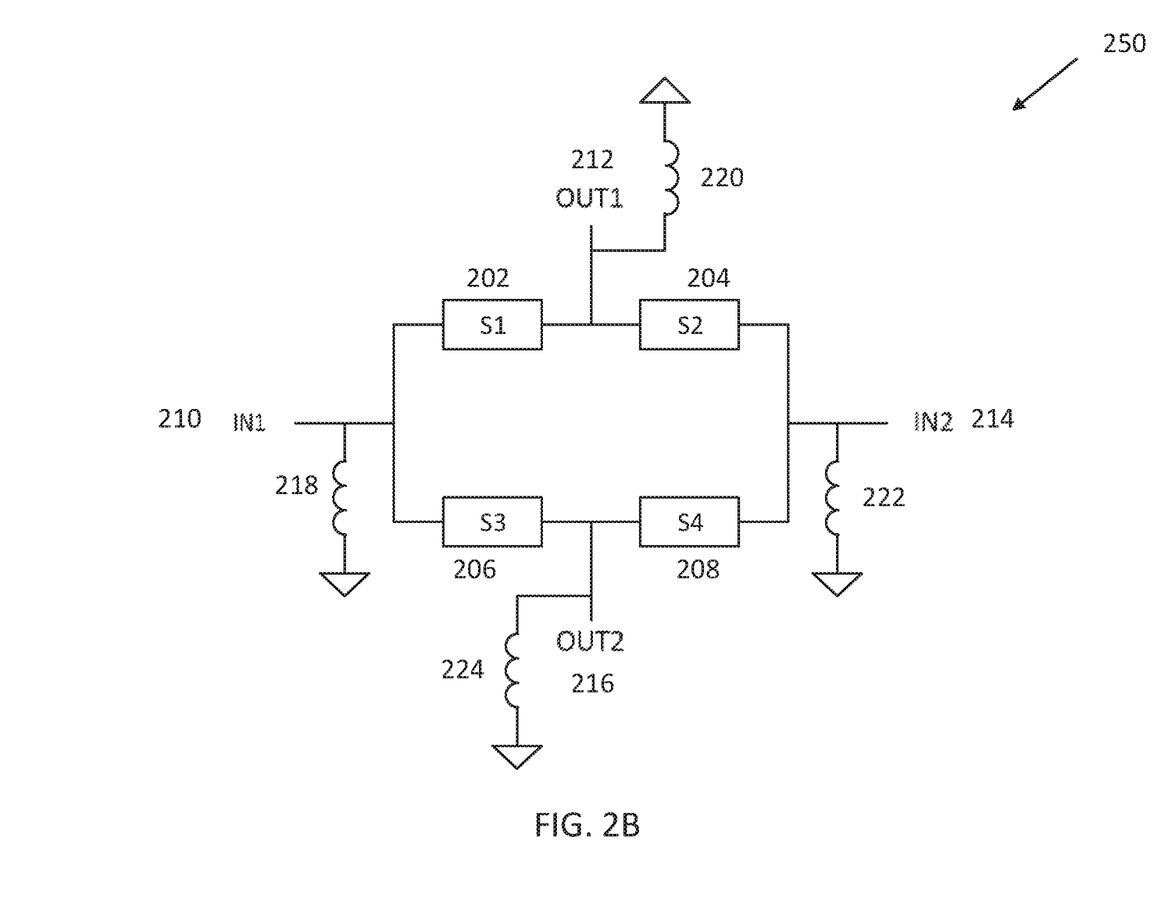
FIG. 2B is schematic diagram of an example of an RF switch assembly.

One approach for improving return loss and insertion loss is to compensate the parasitic capacitances of each RF switch 202-208 with shunt inductances. FIG. 2B is a schematic block diagram illustrating an example of an RF switch assembly 250. The RF switch assembly 250 is similar to the RF switch assembly 200, except the RF switch assembly 250 includes inductors 218, 212, 222, and 224. The inductor 218 is coupled between the first signal input 210 and ground, the inductor 220 is coupled between the first signal output 212 and ground, the inductor 222 is coupled between the second signal input 214 and ground, and the inductor 224 is coupled between the second signal output 216 and ground.

By providing a shunt inductance at each signal input 210, 214 and each signal output 212, 216, the parasitic capacitance of each RF switch 202-208 can be compensated. In one example, each of the inductors 218-224 may correspond to one of the RF switches 202-208, and each inductor may compensate the parasitic capacitance of each corresponding RF switch. For example, at the operating frequency of the RF switch assembly 250 (e.g., the frequency of RF signals received at the signal inputs 210, 214), each of the inductors 218-224 may provide an inductive reactance to offset a parasitic capacitive reactance associated with each corresponding RF switch 202-208. In one example, the RF switches 202-208 may have substantially similar parasitic characteristics and the values of the inductors 218-224 may be substantially the same.

While the addition of the inductors 218-224 can improve the return loss and insertion loss of the RF switch assembly 250 by compensating parasitic capacitance, the approach introduces numerous additional limitations. In some examples, the inductors 218-224 may be placed on the RF switch 202-208 substrates, increasing the area and cost of each substrate. In other examples, the inductors 218-224 may be placed on the RF switch assembly 250 die, increasing the die area and cost. In addition, each of the inductors 218-224 are shunted to ground, creating leakage paths between the inputs and outputs and coupling the RF switch assembly 250 to neighboring components and traces, resulting in reduced isolation performance.

In addition, it is common for RF switch assemblies to have adjacent signal inputs and signal outputs. In some examples, such layouts may allow packaged RF switch assemblies to have pinouts that are more desirable for integration into higher assemblies, such as RF front-end modules of wireless devices. Based on the topology of the RF switch assembly 250, at least two signal paths must be crossed to provide a layout having adjacent signal inputs and signal outputs. In some examples, the crossing of signal paths may reduce isolation between the signal paths and can further degrade the isolation performance of the RF switch assembly 250.

An improved RF switch assembly is provided herein. In at least one embodiment, the RF switch assembly has an optimized topology including a common node shared by each signal path, reducing the size and cost of the RF switch assembly. In some embodiments, the optimized topology of the RF switch assembly may also provide improved performance.

Figure 3:
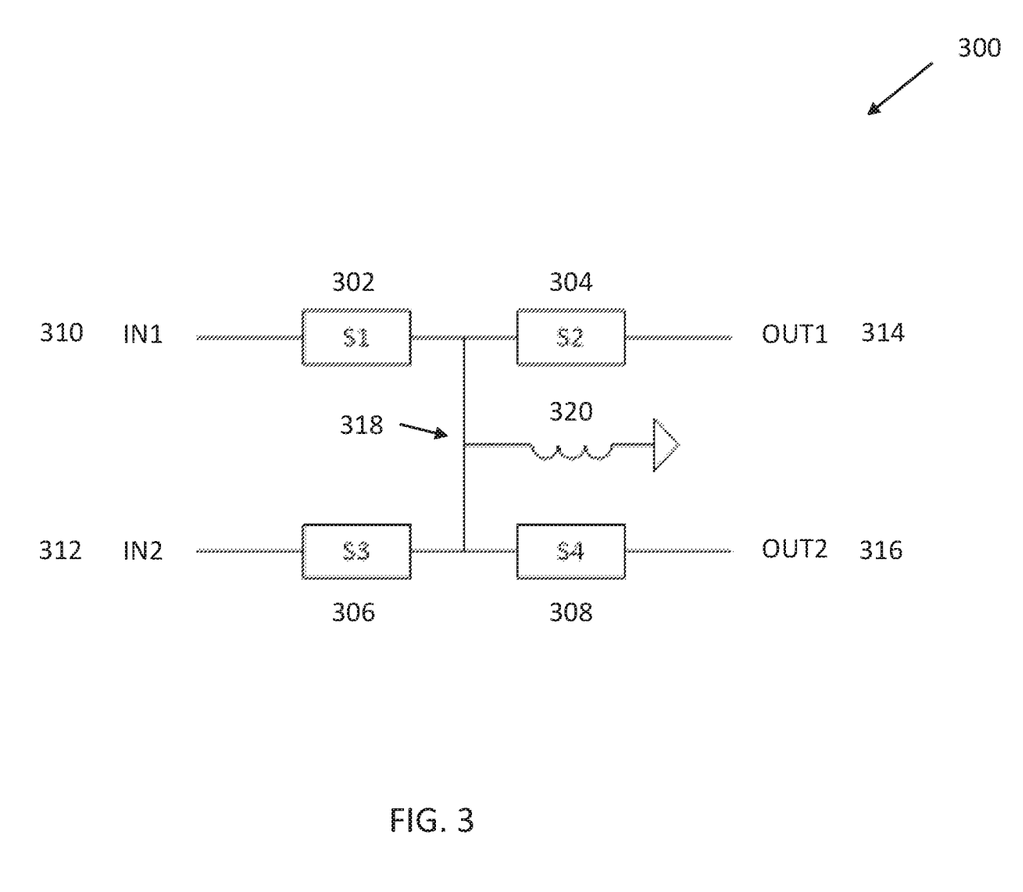
FIG. 3 is schematic diagram of an RF switch assembly in accordance with one embodiment.

FIG. 3 is a schematic block diagram illustrating an RF switch assembly 300. The RF switch assembly 300 is configured as a double-pole double-throw (DPDT) switch having a pair of signal inputs and a pair of signal outputs; however, in other examples the RF switch assembly 300 may be configured to have a different number of poles and/or throws (e.g., SPDT, DP3T, 3P3T, 4PDT, etc.). The RF switch assembly 300 includes a first RF switch 302, a second RF switch 304, a third RF switch 306, and a fourth RF switch 308; however, in other examples, a different number of RF switches may be included. In one example, the transistor-based signal switch 100 of FIG. 1 can be used for each of the RF switches 302-308 (with or without the shunt arm 120).

The first RF switch 302 is coupled between a first signal input 310 and a common node 318 and the second RF switch 304 is coupled between the common node 318 and a first signal output 314. The third RF switch 304 is coupled between a second signal input 312 and the common node 318 and the fourth switch 308 is coupled between the common node 318 and a second signal output 316. The RF switch assembly 300 is operated in various states by coupling different combinations of signal inputs 310, 312 and signal outputs 314, 316 to the common node 318. For example, in a first state, the first switch 302 and the second switch 304 may each be turned on to provide a signal from the first signal input 310 to the first signal output 314 via the common node 318. Likewise, in a second state, the first switch 302 and the fourth switch 308 may each be turned on to provide a signal from the first signal input 310 to the second signal output 316 via the common node 318. Similarly, in a third state, the third switch 306 and the second switch 304 may be turned on to provide a signal from the second signal input 312 to the first signal output 314 via the common node 318 and, in a fourth state, the third switch 306 and the fourth switch 308 may be turned on to provide a signal from the second signal input 312 to the second signal output 316 via the common node 318.

In some examples, the transistors 112 and/or 122 of each RF switch 302-308 may develop a parasitic capacitance to ground, and the parasitic capacitance of each RF switch 302-308 can be compensated by placing a shunt inductance at the common node 318. In one example, as shown in FIG. 3, an inductor 320 may be coupled between the common node 318 and ground. As described above, each signal path of the RF switch assembly 300 includes the common node 318, allowing the inductor 320 to compensate for the parasitic capacitance of each RF switch 302-308.

Based on the topology of the RF switch assembly 300, the effective capacitance at the common node 318 may be viewed as a combination of the parasitic capacitances of all four RF switches 302-308. Being that the inductor 320 is coupled to the common node 318 in a shunt configuration, the effective capacitance at the common node 318 ($C_{eff}$) and the inductor 320 form an inductor-capacitor (LC) network. In one example, $C_{eff}$ and the value of the inductor 320 ($L_{cn}$) correspond to a resonant or tune frequency ($f_0$) of the LC network represented in equation (1) below:

$$f_0 = \frac{1}{2\pi\sqrt{L_{cn}C_{eff}}} \text{(Hz)} \quad (1)$$

In one example, the value of the inductor 320 may be selected such that $f_0$ is substantially the same as an intended operating frequency of the RF switch assembly 300 (e.g., the frequency of RF signals to be received at the signal inputs 310, 312). In some examples, the value of $L_{cn}$ may be selected such that $f_0$ corresponds to a desired frequency band of operation for the RF switch assembly 300. As such, at $f_0$, the inductor 320 provides an inductive reactance offsetting a capacitive reactance associated with $C_{eff}$, providing optimally matched signal paths for the RF signals received at the inputs 310, 312.

As shown in equation (1), the value of $L_{cn}$ is inversely proportional to the value of $C_{eff}$; i.e., for any given $f_0$, the value of $L_{cn}$ decreases as the value of $C_{eff}$ increases. Therefore, by compensating for the combined parasitic capacitance of the RF switches 302-208 at a single point (i.e., the common node 318), the quantity of inductors and the amount of inductance necessary to compensate the total parasitic capacitance of the RF switch assembly 300 can be minimized. In one example, being that the value of the inductor 320 (i.e., $L_{cn}$) is inversely proportional to the value of $C_{eff}$, the value of the inductor 320 can be relatively small and may have a reduced package size. In some examples, the inductor 320 may be included without substantially changing the size of the RF switch 302-308 substrates and/or the RF switch assembly 300 die.

In addition to minimizing the inductance necessary for parasitic capacitance compensation, the topology of the RF switch assembly 300 may also provide improved isolation between the signal inputs 310, 312 and the signal outputs 314, 316. For example, being that parasitic capacitance compensation can be achieved by shunting the inductor 320 to ground at the common node 318, extra ground connections (e.g., at the signal inputs 310, 312 and signal outputs 314, 316) can be avoided, and leakage paths around the RF switches 302-308 may be minimized. In some examples, by avoiding extra ground connections at the signal inputs 310, 312 and the signal outputs 314, 316, isolation between the RF switch assembly 300 and neighboring components and traces may be improved.

In one example, being that each signal path of the RF switch assembly 300 includes the common node 318, the signal inputs 310, 312 and the signal outputs 314, 316 may be arranged in various configurations without crossing signal paths. As shown in FIG. 3, the RF switch assembly 300 may be arranged such that the first signal input 310 is adjacent to the second signal input 312 and the first signal output 314 is adjacent to the second signal output 316. In some examples, maintaining uncrossed signal paths can increase isolation between the signal paths and improve isolation performance of the RF switch assembly 300.

As discussed above, in some examples the RF switches 302-308 may include the shunt arm 120; however, in other examples the shunt arm 120 may be optional for one or more of the RF switches 302-308. In one example, the shunt arm 120 may be included between the series arm 110 of each RF switch 302-308 and the corresponding signal input or output. For example, a shunt arm 120 may be included between the signal input 102 and the series arm 110 of both the first RF switch 302 and the third RF switch 306. Likewise, the shunt arm 120 may be included between the series arm 110 and the signal output 104 of both the second RF switch 304 and the fourth RF switch 308. In some examples, the shunt arm 120 may be optional for inputs or outputs that are used (i.e., active) in each state of an RF switch assembly (e.g., the output of a SPDT RF switch assembly). For example, in an RF switch assembly having two signal inputs and one signal output, a shunt arm 120 may be included between the signal input 102 and the series arm 110 of each RF switch signal. Being that there is only one signal output, the signal output is active in each state of the RF switch assembly and the inclusion of the shunt arm 120 between the series arm 110 and the signal output 104 of the RF switches may be unnecessary.

Figure 4A:
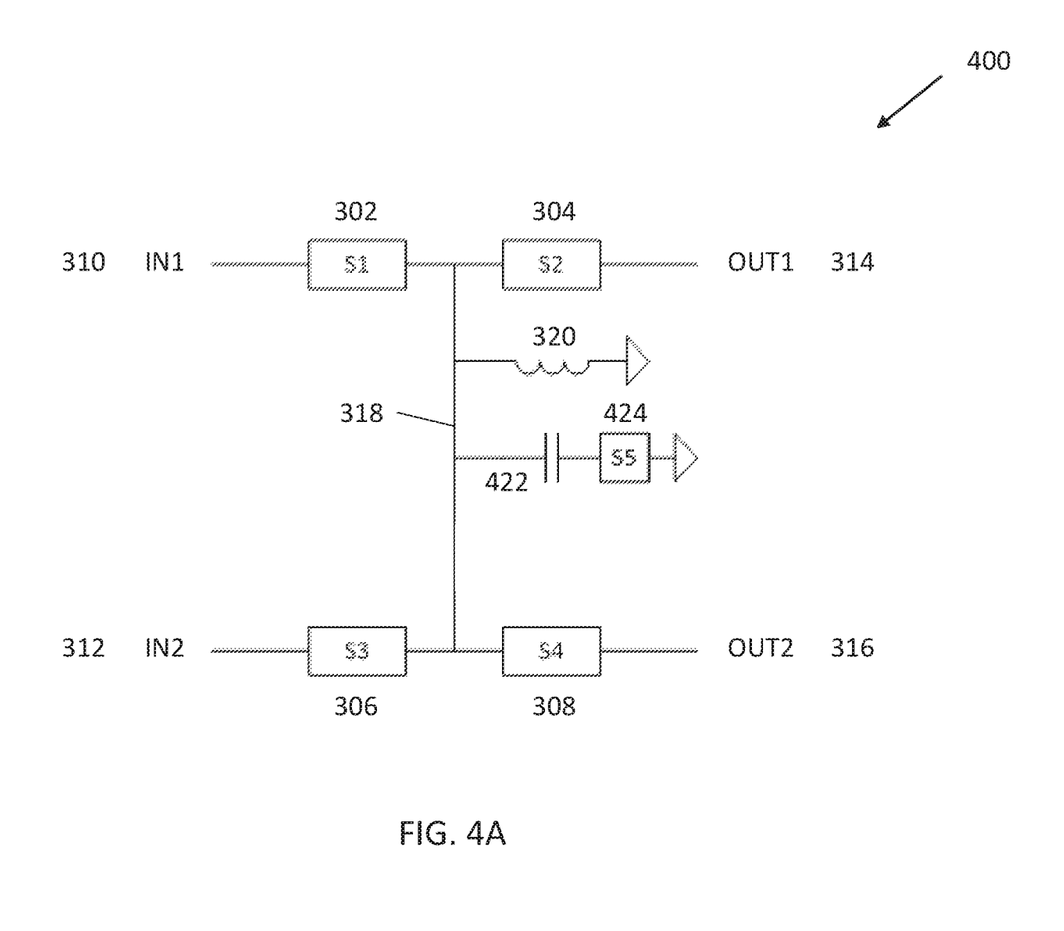
FIG. 4A is a schematic diagram of an RF switch assembly in accordance with one embodiment.

FIG. 4A is a schematic block diagram illustrating an example of an RF switch assembly 400. The RF switch assembly 400 is similar to the RF switch assembly 300 of FIG. 3, except that the RF switch assembly 400 supports multiple modes of operation. In some examples, the RF switch assembly 400 may include additional components coupled to the common node 318 to support different modes of operation.

In some examples, each mode of operation of the RF switch assembly 400 may correspond to a different signal type or signal frequency. In one example, the RF switch assembly 400 may include a capacitor 422 coupled at a first end to the common node 318 and selectively coupled at a second end to ground via a fifth RF switch 424. The RF switch assembly 400 may be configured to switch between different modes of operation by controlling the fifth RF switch 424. For example, the RF switch assembly 400 may have a first mode of operation corresponding to a first RF signal type having a first signal frequency and a second mode of operation corresponding to a second RF signal type having a second signal frequency different (e.g., lower) than the first signal frequency. In the first mode of operation, the fifth RF switch 424 may be turned off to decouple the capacitor 422 from ground. As such, in the first mode of operation, the effective capacitance at the common node 318 ($C_{eff\_1}$) can be viewed as the combination of the parasitic capacitances of the four RF switches 302-308. The value of the inductor 320 is selected such that at the first signal frequency the inductor 320 provides a first amount of inductive reactance to offset the capacitive reactance of $C_{eff\_1}$, providing signal paths optimally matched for the first RF signal type. Likewise, in the second mode of operation, the fifth RF switch 424 may turned on to couple the capacitor 422 between the common node 318 and ground. In the second mode of operation, the effective capacitance at the common node 318 ($C_{eff\_2}$) may be viewed as the combination of the parasitic capacitances of the four RF switches 302-308 and the capacitance of the capacitor 422. As shown above in equation (1), increasing the value of $C_{eff}$ lowers the tune frequency ($f_0$) of the RF switch assembly 400. As such, at the second signal frequency, the inductor 320 provides a second amount of inductive reactance offsetting the capacitive reactance of $C_{\mathit{eff\_2}}$, providing signal paths optimally matched for the second RF signal type.

By selectively coupling and decoupling the second end of the capacitor 422 from ground; i.e., adjusting the effective capacitance at the common node, the RF switch assembly 400 can be tuned to at least two different tune frequencies. In other examples, the RF switch assembly 400 may include additional components to support additional tune frequencies. For example, the RF switch assembly 400 may include a plurality of capacitors configured to be selectively coupled and decoupled from the common node 318 to further adjust the tune frequency of the RF switch assembly 400. In another example, the RF switch assembly 400 may include an adjustable capacitor having a plurality of capacitance values coupled to the common node 318 to support a plurality of tune frequencies. Similarly, in some examples, the RF switch assembly 400 may include a plurality of inductors or a variable inductor that can be controlled and/or adjusted to support additional tune frequencies; i.e., by adjusting the ratio of inductance to effective capacitance at the common node 318.

In addition to different modes of operation for different signal types, the RF switch assembly 400 may also have a high isolation mode of operation. In one example, the RF switch assembly 450 shown in FIG. 4B includes a sixth RF switch 452 coupled between the common node 318 and ground. In the high isolation mode of operation, each of the RF switches 302-308 are turned off and the sixth RF switch 452 may be turned on to couple the common node 318 to ground. While the sixth RF switch 452 is turned on, any leakage passing through the "off" RF switches 302-308 can be shorted to ground, improving the isolation of the RF switch assembly 450. In one example, the transistor-based signal switch 100 of FIG. 1 can be used for the fifth RF switch 424 and the sixth RF switch 452 (with or without the shunt arm 120).

Embodiments of the RF switch assembly 450 as described herein can be implemented in a variety of different modules and assemblies including, for example, a stand-alone RF switch assembly, an RF front-end module, a module combining the RF switch assembly 450 with a power amplifier, or the like.

Figure 4B:
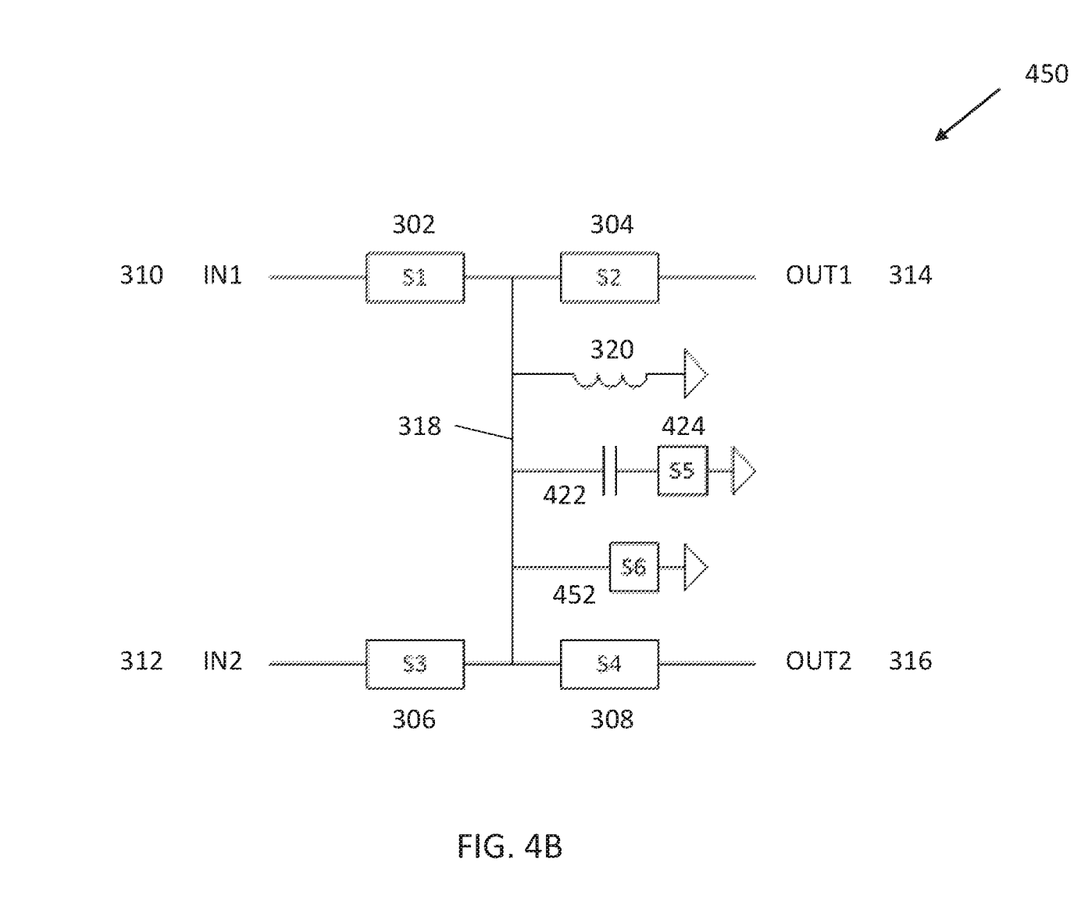
FIG. 4B is a schematic diagram of an RF switch assembly in accordance with one embodiment.

Modules may include a substrate and may include various dies and may include packaging, such as, for example, an overmold to provide protection and facilitate easier handling. An overmold may be formed over a substrate and dimensioned to substantially encapsulate the various dies and components thereon. The module may further include connectivity from the RF switch assembly 450 to the exterior of the packaging to provide signal interconnections, such as input port connections (e.g., signal inputs 310, 312), output port connections (e.g., signal outputs 314, 316), control input connections, etc. Certain examples may have multiple connections to accommodate access to various individual components in the module (e.g. RF switches 302-308, 424, and 452). The various connections may be provided in part by wire bonds or solder bumps, for example, and may include multiple electrical connections where appropriate.

Embodiments of the RF switch assemblies disclosed herein, optionally packaged into a module, may be advantageously used in a variety of electronic devices. General examples of an electronic device may include a circuit board having numerous modules mounted thereon. The circuit board may have multiple layers and may include circuit elements and interconnections in the layers and/or mounted on the surface of the circuit board. Each of the modules may have a multi-layer substrate within and upon which there may also be various circuit elements and interconnections. Additionally, the modules may further include dies, each of which may have multiple layers and include various circuit elements and interconnections. An RF switch assembly in accord with aspects and embodiments disclosed herein may be implemented within, among, or across any of the layers of the various structures, e.g., circuit board, substrates, and dies, as part of an electronic device, such as a cell phone, tablet, laptop computer, smart device, router, cable modem, wireless access point, etc.

As described above, systems and methods directed to an improved RF switch assembly are provided herein. In at least one embodiment, the RF switch assembly may have an optimized topology including a common node shared by each signal path, reducing the size and cost of the RF switch assembly and providing improved performance. As such, aspects and embodiments of the RF switch assembly described above may be advantageously used in wireless devices to support, for example, 3G, 4G, LTE, and 5G wireless communications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A radio-frequency switch assembly comprising:
a plurality of inputs, each input of the plurality of inputs being configured to receive a radio-frequency signal of a plurality of radio-frequency signals;
a plurality of outputs configured to provide the plurality of radio-frequency signals;
a common node between the plurality of inputs and the plurality of outputs;
a plurality of input switches, each input switch of the plurality of input switches being coupled between a corresponding input of the plurality of inputs and the common node; and
a plurality of output switches, each output switch of the plurality of output switches being coupled between the common node and a corresponding output of the plurality of outputs.

2. The radio-frequency switch assembly of claim 1 wherein each input switch of the plurality of input switches is configured to be turned on to provide the radio-frequency signal received by the input corresponding to the input switch to the common node.

3. The radio-frequency switch assembly of claim 2 wherein each output switch of the plurality of output switches is configured to be turned on to provide the radio-frequency signal from the common node to the output corresponding to the output switch.

4. The radio-frequency switch assembly of claim 1 further comprising a shunt inductance coupled between the common node and a reference potential.

5. The radio-frequency switch assembly of claim 4 wherein a first radio-frequency signal of the plurality of radio-frequency signals has a first signal frequency and a value of the shunt inductance is based at least in part on the first signal frequency.

6. The radio-frequency switch assembly of claim 5 wherein the shunt inductance is configured to provide optimal compensation for a combined parasitic capacitance of the plurality of input switches and the plurality of output switches at the first signal frequency.

7. The radio-frequency switch assembly of claim 1 further comprising a shunt switch connected between the common node and a reference potential.

8. The radio-frequency switch assembly of claim 7 wherein the shunt switch is turned on to couple the common node to the reference potential to improve isolation of the radio-frequency switch assembly.

9. A radio-frequency switch assembly having at least two modes of operation comprising:
a plurality of inputs, each input of the plurality of inputs being configured to receive a radio-frequency signal of a plurality of radio-frequency signals;
a plurality of outputs configured to provide the plurality of radio-frequency signals;
a common node between the plurality of inputs and the plurality of outputs;
a plurality of input switches, each input switch of the plurality of input switches being coupled between a corresponding input of the plurality of inputs and the common node;
a switchable shunt capacitance switchably connected between the common node and a reference potential; and
a plurality of output switches, each output switch of the plurality of output switches being coupled between the common node and a corresponding output of the plurality of outputs.

10. The radio-frequency switch assembly of claim 9 wherein each input switch of the plurality of input switches is configured to be turned on to provide the radio-frequency signal received by the input corresponding to the input switch to the common node.

11. The radio-frequency switch assembly of claim 10 wherein each output switch of the plurality of output switches is configured to be turned on to provide the radio-frequency signal from the common node to the output corresponding to the output switch.

12. The radio-frequency switch assembly of claim 11 wherein the plurality of radio-frequency signals have a plurality of signal frequencies.

13. The radio-frequency switch assembly of claim 12 further comprising a shunt inductance coupled between the common node and the reference potential, the shunt inductance having a value based at least in part on a first signal frequency of the plurality of signal frequencies.

14. The radio-frequency switch assembly of claim 13 wherein during a first mode of operation the switchable shunt capacitance is disconnected from the reference potential and the common node has a first common node capacitance corresponding to a parasitic capacitance of the plurality of input switches and a parasitic capacitance of the plurality of output switches.

15. The radio-frequency switch assembly of claim 14 wherein during the first mode of operation the shunt inductance provides optimal compensation for the first common node capacitance at the first signal frequency.

16. The radio-frequency switch assembly of claim 15 wherein during a second mode of operation the switchable shunt capacitance is connected to the reference potential and the common node has a second common node capacitance corresponding to the parasitic capacitance of the plurality of input switches, the parasitic capacitance of the plurality of output switches, and the switchable shunt capacitance.

17. The radio-frequency switch assembly of claim 16 wherein a value of the switchable shunt capacitance is based at least in part on a second signal frequency of the plurality of signal frequencies.

18. The radio-frequency switch assembly of claim 17 wherein during the second mode of operation the shunt inductance provides optimal compensation for the second common node capacitance at the second signal frequency.

19. The radio-frequency switch assembly of claim 16 wherein the switchable shunt capacitance includes a variable capacitor having a plurality of capacitance values and the variable capacitor is adjusted to one of the plurality of capacitance values based at least in part on a selected signal frequency of the plurality of signal frequencies.

20. The radio-frequency switch assembly of claim 19 wherein during the second mode of operation the shunt inductance provides optimal compensation for the second common node capacitance at the selected signal frequency.

* * * * *